United States Patent [19]

Ludwig

[11] 4,017,475

[45] Apr. 12, 1977

[54] LIGNIN COMPOSITION AND A PROCESS FOR ITS PREPARATION

[75] Inventor: Charles H. Ludwig, Bellingham, Wash.

[73] Assignee: Georgia-Pacific Corporation, Portland, Oreg.

[22] Filed: Sept. 22, 1975

[21] Appl. No.: 615,345

Related U.S. Application Data

[63] Continuation-in-part of Ser. No. 542,562, Jan. 20, 1975, abandoned.

[52] U.S. Cl. .................. 260/124 A; 260/124 R; 252/121
[51] Int. Cl.² ........................................ C07G 1/00
[58] Field of Search .............................. 260/124 R

[56] References Cited

UNITED STATES PATENTS

| | | | |
|---|---|---|---|
| 2,122,124 | 6/1938 | Alles | 260/124 R |
| 2,709,696 | 5/1955 | Wiest | 260/124 A |
| 2,863,780 | 12/1956 | Ball | 260/124 R |
| 3,126,350 | 3/1964 | Borgfeldt | 260/124 R |
| 3,296,159 | 1/1967 | Lissner | 260/124 R |
| 3,407,188 | 10/1968 | Cavogna | 260/124 R |
| 3,671,428 | 6/1972 | Kim | 260/124 R |
| 3,784,493 | 1/1974 | Giguere et al. | 260/124 A |

*Primary Examiner*—Lewis Gotts
*Assistant Examiner*—D. R. Phillips
*Attorney, Agent, or Firm*—Peter P. Chevis

[57] ABSTRACT

Aminoalkylated hydroxyphenylated lignosulfonate is described. The composition is prepared by reacting a hydroxyphenylated lignosulfonate with a nitrogen compound and an aldehyde.

22 Claims, No Drawings

LIGNIN COMPOSITION AND A PROCESS FOR ITS PREPARATION

This application is a continuation-in-part of patent application Ser. No. 542,562, filed on Jan. 20, 1975, now abandoned.

This invention relates to novel lignin compounds as a process for their preparation. More particularly it pertains to a product and process for the preparation of aminoalkylated lignin prepared from a hydroxyphenylated lignosulfonate.

Lignin is a polymeric substance found in plant and vegetable tissues associated with cellulose and other plant constituents. In the pulp and paper industry, lignin-containing material such as wood, straw, corn stalks, baggasse, and other vegetable and plant tissues are processed to recover the cellulose pulp with the lignin being obtained as a by-product. Since vegetable and plant tissue contain up to about 30% lignin, large amounts of lignin are available. Considerable effort has been expended in lignin research with only limited success in the development of methods and processes to utilize more fully the chemical values of lignin. Lignin and lignosulfonates have found only limited markets resulting in an appreciable amount of the pulping liquors having to be processed mainly for disposal purposes rather than for recovery of any chemical values.

It is therefore an object of this invention to provide a process for treating spent sulfite liquor so that the chemical value of the product can be utilized. A further object is to provide a lignin derivative which is reactive and can be used in formation of other chemical products. A still further object is to provide a process for the preparation of a cationic polyelectrolyte from a lignosulfonate.

The above and other objects are attained by the reaction of the lignosulfonate or spent sulfite liquor with phenol to obtain a hydroxyphenylated lignosulfonate having a phenolic hydroxyl content of at least 2½% and reacting the hydroxyphenylated lignosulfonate with ammonia or a primary or secondary amine having from 1 to 22 carbon atoms or a mixture thereof and an aldehyde to obtain an aminoalkylated lignin containing at least 3% organic nitrogen. Secondary amines having organic substituents of alkyl, cycloalkyl, and substituted alkyl radicals of from 1 to 18 carbon atoms or a mixture of a secondary amine with ammonia or a primary amine are preferably used with an aldehyde selected from the group consisting of formaldehyde, benzaldehyde, and furfural. The products obtained have cationic properties and may be used as cationic dispersing or emulsifying agents. Further, the products are also reactive and may be further reacted with reagents reacting with phenolic hydroxyl groups or the amine groups to form high-molecular weight products which may then function as flocculating agents or be used in preparation of coatings.

Lignosulfonates or sulfonated lignins obtained from any source may be used. While there is some variation in the chemical structure of lignin and of other constituents found in different plants, depending upon the type of plant, place where it is grown, and also upon the method used in recovery or isolation of the particular constituents from the plant tissue, the basic structure and properties of these materials upon sulfonation are similar and form the well-known group of materials referred to as "lignosulfonates". One of the main sources of lignosulfonates or sulfonated lignin is the residual pulping liquor obtained in the pulp and paper industry. In the sulfite pulping, lignocellulosic material is digested with a sulfite or bisulfite, the resulting residue being a sulfonated pulping liquor commonly referred to as "spent sulfite liquor" containing the sulfonated lignin products. In other pulping processes, the residual pulping liquor as obtained from the process may not be a sulfonated product. However, the residual liquor or product containing the lignin portion of the lignocellulosic material may be sulfonated after separation from the pulp.

The sulfonated lignin products from sulfite pulping process or obtained by the sulfonation of other residual pulping liquors or lignin-containing materials may contain other constituents besides lignin. These products may contain carbohydrates, degradation products of carbohydrates, and resinous materials as well as other organic and inorganic constituents. Although these non-lignin materials may be removed or the lignosulfonate portion may be recovered from the liquor, it is not necessary to do so. The lignin product as obtained containing all the constituents may be hydroxyphenylated and aminoalkylated. Some of the non-lignin constituents such as carbohydrates, may react with the reactants during the hydroxyphenylation and aminoalkylation reactions to form relatively low-molecular weight products which may not necessarily be detrimental in the final use made of the aminoalkylated hydroxyphenylated lignin.

In addition to the purification of the sulfonated lignin products, the sulfonated residual liquor such as a spent sulfite liquor or sulfonated lignin may be subjected to various pretreatments such as for example acid, alkaline or heat treatment, as well as oxidation or reaction with other chemicals to remove or modify some of the constituents or for other purposes. The lignin constituents may be affected to a certain extent by such treatment and the treatment may be beneficial as long as it is not so severe as to destroy the polymeric nature of the lignin. Thus, the terms "lignosulfonate" and "sulfonated lignin" used herein and commonly in the field include products which have been subjected to these various treatments as long as the product retains the basic properties and characteristics associated with untreated product.

When the aminoalkylated hydroxyphenylated lignosulfonate is to be further polymerized in the formation of high-molecular weight products, generally it is preferred to remove the non-lignin constituents prior to the aminoalkylation reaction. The non-lignin constituents are usually relatively low-molecular weight products and may easily be separated from the lignin constituents by using methods such as dialysis, gel permeation, chemical precipitation with acid or calcium hydroxide, or solvent extraction as well as other methods well known in the art for the separation of high-molecular weight organic polyelectrolytes from low-molecular weight materials. In addition to separating the non-lignin constituents from the lignin material, the lignin may be separated into fractions of various molecular weights prior to the aminoalkylation reaction. Further, the lignosulfonate or spent sulfite liquor may be reacted to increase the molecular weight of the lignosulfonate by polymerization or condensation such as heating the lignosulfonate under acid conditions or with relatively small amounts of formaldehyde or other cross-linking agents. In the polymerization or condensation reactions, some of the desirable reaction sites are utilized so that the polymerization or condensation is carried to a limited extent if the final product is to be further reacted or used as an intermediate.

The various known methods for the interaction of phenol with lignosulfonates may be used in the hydroxyphenylation of the lignosulfonate. The reaction may be carried out by simply intermixing or dissolving a dry lignosulfonate product in the phenol. The reaction may also be carried out in a liquid medium or solvent in which at least one of the reactants is soluble. An aqueous medium is commonly used, since lignosulfonates and many of the phenols are soluble in water. However, organic solvents may also be employed. Halogenated hydrocarbons of from 1 to 4 carbon atoms, dioxane, nitromethane, and dimethylsulfoxide are illustrative of the solvents which may be used. The lower aliphatic alcohols, such as alcohols having from 1 to 4 carbon atoms, lower aliphatic organic acids of from 1 to 4 carbon atoms, and glycols may also be employed. When an organic solvent such as an organic acid or alcohol is used to aid in dissolving the lignosulfonate and phenol, generally the amount used is minimized with amounts of from 5 to 20 weight percent of the lignosulfonate solids being used. An excess is avoided so that the solvent does not have to be recovered.

The hydroxyphenylation may be effected under either alkaline or acid conditions. Also, at times it may be desirable to effect the reaction with the lignosulfonate or the sulfonated lignin product being de-ashed or in the acid form. The reaction temperature employed may be widely varied depending mainly upon the particular process and phenol used in the hydroxyphenylation. While the reaction may proceed at a significant rate at room temperature and lower, generally, the reaction mixture is heated for from ¼ to 6 hours at a temperature in the range of 80° C to 180° C to obtain a more rapid rate and greater amount of interaction between the lignosulfonate and the phenol.

Sufficient phenol is reacted with the lignosulfonate to increase the phenolic hydroxyl content of the product to at least 2½ percent. The desired phenolic hydroxyl content may generally be obtained by reacting to combine at least 5 weight percent of phenol, based upon the lignosulfonate solids, with the lignosulfonate. A product having from at least 10 percent up to the maximum amount of phenol which can be normally reacted with the lignosulfonate is generally used. Although products containing 40 percent and higher of interacted phenol may be prepared under normal reacting conditions, products containing from 20 to 35 weight percent of interacted phenol are most readily available. The latter products generally have a phenolic hydroxyl content of about 5 to 8 weight percent and are most often used. Usually the reaction is carried out by intermixing the lignosulfonate with from 20 to 100 weight percent of phenol, based upon the lignosulfonate solids. A portion of the phenol may remain unreacted which may be removed or recovered for reuse by extraction with a suitable solvent, vacuum distillation, or other means. In the hydroxyphenylation of the lignosulfate, desulfonation of the lignin is effected which limits the solubility of the product in water. Thus, for the more highly hydroxyphenylated lignosulfonates, the organically combined sulfur content may be decreased to 1 to 3 percent so that the solubility of the product in water is sufficiently limited to have the product precipitate out in an aqueous medium providing a very convenient method for the recovery or the separation of the hydroxyphenylated lignosulfonate from other non-lignin constituents which may have been present in the spent sulfite liquor or other sulfonated lignin products used.

While phenol is the preferred phenol used for the hydroxyphenylation of the lignosulfonates, other phenols such as cresols, xylenols, resorcinol, catechol, hydroquinone, and naphthol as well as chlorinated phenols may be used to prepare hydroxyphenylated lignosulfonates. The monohydric phenols are preferred.

The hydroxyphenylated lignosulfonate may be aminoalkylated by a number of methods known to the art with one of the simple and easy methods being by means of the Mannich reaction where the hydroxyphenylated lignosulfonate is reacted with formaldehyde or an aldehyde having no alpha hydrogen, i.e. no hydrogen on the alpha carbon, such as benzaldehyde or furfural, and ammonia or an amine. Preparation of the amino alkylated lignins by this method is disclosed in U.S. Pat. Nos. 2,863,780 and 3,407,188 and in U.S. Pat. No. 2,709,696 wherein the latter patent the aminoalkylation is carried out in a non-aqueous medium. Secondary amines are most commonly used, unless a high molecular weight product is desired in which event ammonia or a primary amine by itself or with the secondary amine may be used. In the reaction of the hydroxyphenylated lignin with the amine and aldehyde, it is believed that the reaction occurs by substitution of the reactive hydrogens of the hydroxyphenylated lignosulfonate attached to carbon in the positions ortho or para to the phenolic hydroxyl groups of the lignin. The nitrogen compound in addition to reacting in the aminoalkylation of the lignin will also react with the residual sulfonic acid groups and any carboxyl groups which may be present forming amine salts which may have limited solbility in an aqueous medium. Limited water solubility of these salts may be advantageous in flocculation of particular systems.

In the aminoalkylation reaction, generally amounts stoichiometric or greater of amine and aldehyde to the phenolic hydroxyls are added to react with available active hydrogens. Since most of the active hydrogens are ortho or para to the phenolic hydroxyl groups, it is convenient to base the amount of reactants reacted with the lignin on the phenolic hydroxyl content of the hydroxyphenylated lignosulfonate which may be determined by ultra-violet difference analysis or by conductometric titration. The amounts, however, may be widely varied and the equivalents of aldehyde and amine used to free phenolic hydroxyl may be from 0.5 up to 4 or higher, as long as the product obtained contains an organic nitrogen content of 3% or higher. Products having organically combined nitrogen in the range of about 5 to 9 weight percent or higher are preferred. The relatively high organic nitrogen content obtained in the product is a result of the high aromatic reactivity of the hydroxyphenylated lignosulfonate resulting in an increased reaction with the amine and aldehyde. The increased reaction with the amine and aldehyde, which is indicated by the organic nitrogen content, imparts unique properties to the product, especially surface activity. An aminoalkylated lignosulfonate which has not been phenolated generally has an organic nitrogen content in a range of only about 1½ to 2½ percent.

Aminoalkylated hydroxyphenylated lignin products of varying properties can be obtained by varying the amount of phenolation, but more effectively, by selection of the nitrogen reactant or amine used in the reaction with the hydrophenylated lignin. Hydroxyphenylated lignins having about 15 weight percent and higher, based upon the spent sulfite liquor solids, of phenol reacted with the lignosulfonate become effective water-in-oil and oil-in-water emulsifiers when reacted with long-chain amines. The long aliphatic chain amines such as octadecylamine or N-methyl-N-octadecylamine will provide sufficient lipophilic character to the product for the product to be an emulsifier for oil-in-water emulsions. A hydroxyphenylated lignosulfonate, aminoalkylated with dimethylamine, is an effective additive in preparation of asphalt emulsions. The solubility and lipophilic properties of the products may be varied by using other amines such as di-2-ethylhexylamine, diamylamine or an alkanolamine such as diethanolamine. Upon the reaction of the hydroxyphenylated lignin with ammonia, or a short chained primary amine, or with a mixture of the above with a secondary amine, additional polymerization may be obtained such that a high molecular weight product results. Such products may be advantageous for the preparation of flocculating or other agents where high molecular weight is desirable. High-molecular weight aminomethylated hydroxyphenylated lignosulfonates may be used for recovery or precipitation of lignosulfonate from solutions. Lignosulfonates form insoluble amine salts. The aminomethylated hydroxyphenylated lignosulfonates contain reactive amine groups which will react with lignosulfonate, precipitating the lignosulfonate. In a similar manner other polyanionic polymers may be recovered as well as heavy metals from solutions by first complexing the metal with the lignosulfonate or other polyanionic polymer and then treating the acidified solution with aminomethylated hydroxyphenylated lignosulfonate which due to the amine groups impart cationic properties.

In addition to using aminoalkylated hydroxyphenylated lignosulfonate as surface active agents, these products may also be used as intermediates and further reactants in the preparation of flocculating agents or high molecular weight polymers which may be used for resin or coating preparation. For example, the aminoalkylated product may be cross-linked with polyoxyalkylene linkages in the formation of flocculating agents as disclosed in U.S. Patent application Ser. No. 305,922 filed on Nov. 13, 1972. The products may also be reacted with ethylene or propylene oxide in the preparation of polyols which may be used as components in polyurethane foam or in preparation of alkyd-type coatings and also in the preparation of ion exchange resins.

The following examples further illustrate the invention.

EXAMPLE I

A hydroxyphenylated lignosulfonate was aminoalkylated in the preparation of an intermediate which was then cross-linked with a sulfonate diester in the preparation of a high-molecular weight water soluble flocculating agent.

A fermented calcium base liquor was de-ashed by addition of sulfuric acid to a pH of 0.7 to precipitate the calcium as calcium sulfate. The acidified lignosulfonate was then spray-dried. The de-ashed, spray-dried, spent sulfite liquor was reacted with phenol by dissolving the de-ashed lignin in an equal part of molten phenol. The reaction mixture was then heated in a container equipped with a reflux condenser and stirrer at a temperature of about 120° C for about 3½ hours. At the end of the reaction time, 0.25 part of water was added to the mixture and the heating was continued to distill off the unreacted phenol and water mixture under reduced pressure at a temperature of from 70° to 80° C. The remaining tarry mixture was then mixed with water, precipitating the major portion of the hydroxyphenylated lignin. The water was then decanted and the precipitation washed with water. The supernatant and wash water were evaporated on a steam bath to remove phenol and other volative materials and the residue returned to the precipitate. The combined precipitate obtained was boiled in water for 3 hours and dried at atmospheric pressure at 100° C and under reduced pressure of 1 millimeter of mercury to remove any unreacted phenol. The phenolic hydroxyl content of the hydroxyphenylated lignosulfonate was estimated to be 6.7 weight percent as determined by conductiometric titration with NaOH and the organically combined sulfur content was 1.2%.

The hydroxyphenolated lignosulfonate was aminoalkylated by reaction with dimethylamine and formaldehyde using the Mannich reaction. The hydroxyphenylated lignosulfonate in an amount of 250 grams was dissolved in 820 milliliters of 95% ethanol. To the solution, a 25 weight percent aqueous solution of dimethylamine was added in an amount of 422 grams after which 250 grams of a 30 weight percent aqueous solution of formaldehyde was added dropwise to the reaction mixture over a period of 30 minutes while maintaining the reaction temperature below 30° C. After the addition of the formaldehyde, the reaction mixture was heated at 82° C for 2 hours at reflux. Essentially all of the alcohol was then evaporated from the reaction mixture by heating on a steam bath. The residue remaining was boiled with water for 1 hour, filtered and dried under reduced pressure of 0.5 millimeter of mercury for 40 hours at 100° C. The aminoalkylated hydroxyphenylated lignosulfonate had an organically combined nitrogen content of about 6.5% determined by subtracting the nitrogen removed by distillation upon treatment with an aqueous magnesium hydroxide solutions from the Kjeldahl nitrogen analysis.

The aminoalkylated hydroxyphenylated lignosulfonate prepared above was cross-linked with a sulfonate diester of a polyalkylene glycol having a molecular weight of around 400. The diester was prepared by reacting the polyethylene glycol with para-toluenesulfonyl chloride in pyridine. The polyethylene glycol was dissolved in the pyridine and the toluenesulfonyl chloride was gradually added to the polyethylene glycol solution at a temperature of around 10° C. After the toluenesulfonyl chloride was added, the reaction mixture was stirred for about 2 hours at room temperature. The amount of toluenesulfonyl chloride added was slightly more than an equivalent amount necessary to react with all the polyethylene glycol hydroxyl groups. The diester product obtained was recovered by adding the reaction mixture to acidified ice water and extracting the diester product with methylene chloride. The methylene chloride phase was dried by addition of anhydrous sodium sulfate, filtered and the solvent then removed by evaporation under reduced pressure.

In the cross-linking reaction, 23.4 grams of aminoalkylated hydroxyphenylated lignosulfonate was dissolved in 45 milliliters of water heated to 80° to which 2.4 grams of a 50 weight percent sodium hydroxide solution had been added. After the aminoalkylated hydroxyphenylated lignosulfonate had dissolved in the alkaline solution, 11.8 grams of the tosylate diester was added and the reaction mixture heated to reflux. Additional water in an amount of 100 milliliters was added after which the reaction mixture was further heated for about 30 minutes. The reaction mixture was then cooled, the pH adjusted to 5 by addition of hydrochloric acid, and dialyzed against running water for 18 hours using a regenerated cellulose membrane to remove the sodium tosylate formed in the reaction. The solution remaining after dialysis was centrifuged to remove 14.6 grams of insoluble material on a dry basis. The clear centrifugate obtained was tested as a flocculating agent in flocculation of clay in an aqueous system using the soluble reaction product in an amount of from 1 to 10 parts per million on a dry basis as described below.

A commercially available low-yield clay (Panther Creek) was dispersed in water to obtain a dispersion containing about 4 weight percent of the clay. Sodium chloride was also added in an amount of about 1000 parts per million. The test was carried out by shaking and inverting 100 milliliter samples of the clay suspension at a pH of about 5 in a 100 milliliter graduated cylinder and then noting the time taken for the boundary line of the clay to settle to the half-volume or 50 milliliter mark on the graduate. The clay dispersion with no flocculating agent settled to the 50 milliliter mark in 600 seconds. The results obtained are shown in the table below.

| Amount Used, Parts Per Million | Settling Time, Secs. |
|---|---|
| 1 | 230 |
| 2 | 115 |
| 3 | 77 |
| 5 | 60 |
| 10 | 50 |

EXAMPLE II

A fermented calcium based spent sulfite liquor was de-ashed by treating the spent sulfite liquor with sulfuric acid to precipitate the calcium as calcium sulfate. After filtration to remove the calcium sulfate, the lignosulfonic acid was spray-dried. The spray-dried lignosulfonic acid was then hydroxyphenylated by dissolving the spray-dried lignosulfonic acid in equal weight ratio of molten phenol. The mixture was then refluxed for about four hours after which water was added and the unreacted phenol and water distilled off under reduced pressure at a temperature of from 55° to 80° C. The resulting mixture obtained was then mixed with water three times and the insoluble hydroxyphenylated lignosulfonate recovered by decanting supernatant liquid. The final product was boiled in the water for three hours after which the insoluble product was finally dried in a vacuum oven at 80° C at 1 millimeter of pressure for 60 hours.

The methoxyl content of the hydroxyphenylated lignosulfonate was 6.8 which was decreased from 9.4 for the unreacted, de-ashed, spent sulfite liquor. Taking into account the desulfonation that occurs this indicates that the hydroxyphenylated product solids contain approximately 37% combined phenol.

The above hydroxyphenylated lignosulfonate was aminomethylated by reacting the hydroxyphenylated lignosulfonate with dimethylamine and ammonia in a weight ratio of 8 parts of dimethylamine and two parts of ammonia, and 8 parts of formaldehyde per 10 parts of the hydroxyphenylated lignosulfonate, on a dry basis.

The hydroxyphenylated lignosulfonate was dissolved in 95% ethanol after which the dimethylamine as a 25% aqueous solution and ammonia as a 29% aqueous solution were added. The formaldehyde as a 30% aqueous solution was added drop-wise over a period of 30 minutes while the reaction mixture was maintained at 30° C. The mixture was then reacted by being heated at reflux for 2 hours after which additional ethanol was added and the mixture distilled under reduced pressure to remove the ethanol and unreacted amine or formaldehyde. The remaining residue was then washed with ethanol and the residual ethanol was allowed to evaporate overnight on a steam bath. The ethanol-washed product was then heated in boiling water for about 30 minutes to remove water solubles and the remaining insoluble product dried under reduced pressure at 40° C after which it was treated with sulfuric acid at a pH of 4 to convert the product to the water-soluble sulfate salt. The product obtained was dried and analyzed. It was found to contain 4.3% organically combined nitrogen which on a sulfate-free basis would be about 5.1 percent organically combined nitrogen.

The prepared product was effective as a modifier of cationic emulsifiers for the preparation of slow-set asphalt-in-water emulsions.

In a process similar to that above a hydroxyphenylated lignosulfonate was aminomethylated using as amines di-2-ethylhexylamine, diamylamine and diethanolamine. The product obtained with di-2-ethylhexylamine was insoluble in dilute hydrochloric acid and in water but soluble in dilute sodium hydroxide and in ethanol. The diamylamine product was insoluble in dilute hydrochloric acid and sodium hydroxide and mostly soluble in ethanol and in a 50% ethanol-water mixture. The product prepared using diethanolamine was soluble in dilute hydrochloric acid, sodium hydroxide, ethanol and water.

Also a product similar to that above was prepared wherein the amount of dimethylamine was decreased to 7.5 parts and the ammonia increased to 2.5 parts by weight per the 10 parts of the hydroxyphenylated lignosulfonate. A high-molecular weight product was obtained. Only about ⅔ of the product, when converted to the sulfate salt, was soluble in water with ⅓ being insoluble.

EXAMPLE III

A streaming current determination of an aminoalkylated hydroxyphenylated lignosulfonate was made and compared to the streaming current for an aminoalkylated lignosulfonate which had not been hydroxyphenylated, for a hydroxyphenylated lignosulfonate which had not been aminoalkylated, and for a fermented calcium-base spent sulfite liquor.

A hydroxyphenylated lignosulfonate, similar to the product of the first part of Example II, was aminomethylated by reacting the product with about 4.2 parts by weight of dimethylamine and 2.5 parts of formaldehyde on a dry basis per 10 parts of the hydroxyphenylated lignosulfonate in a manner similar to that described in Example I except the product was dried at 60° C at 20 milliliters of mercury pressure for 2 hours.

The aminoalkylated sodium lignosulfonate was prepared from a fermented calcium-base spent sulfite liquor which had been purified by amine salt extraction. The calcium-base liquor was acidified to a pH of about 0.2 of sulfuric acid and filtered to remove the precipitated calcium sulfate. After filtration to remove the calcium sulfate, triamylamine was added to the filtrate and the resultant lignosulfonate-amine salt extracted with butanol. An aqueous sodium hydroxide solution was then added to the butanol solution converting the lignosulfonate to the sodium salt in the aqueous phase and regenerating the amine which stayed in the butanol phase. The purified lignosulfonate was aminoalkylated in a manner similar to that described above. The purified lignosulfonate in an amount of 10 parts by weight and dimethylamine in an amount of 6 parts by weight were added to a 63% ethanol solution in which the lignosulfonate was soluble. The amine was added as a 25% aqueous solution. To the mixture, 3.5 parts by weight of formaldehyde was added as a 37% by weight aqueous solution. The formaldehyde solution was added drop-wise over a period of 30 minutes while the reaction mixture was maintained at 22°–24° C. The mixture was then reacted by being heated at reflux for 2 hours after which the reaction mixture was evaporated and dried by being placed upon a steam bath for 16 hours. The sample thus obtained was analyzed for organically bound nitrogen and the streaming current determined. Also a sample of the product dried on the steam bath was further dried at 60° at 20 millimeters of mercury pressure similar to that used for the aminoalkylated hydroxyphenylated lignosulfonate and likewise analyzed and tested.

The hydroxyphenylated lignosulfonate tested was prepared in a similar manner to the hydroxyphenylated lignosulfonate which was aminoalkylated above.

The streaming current was determined using a Waters Associates apparatus where the streaming current results from the generation of surface charges from the sample adsorbed on the surfaces of an oscillating plastic piston and plastic boot. The determinations were made using aqueous solutions of the products at concentrations of 10 parts per million adjusted to pH 2.5. The results obtained and the organically combined nitrogen content of the products are shown in the following table:

| Product | Streaming Current ma | Organic Nitrogen Content, % |
|---|---|---|
| Aminoalkylated hydroxyphenylated lignosulfonate | +81 | 6.2 |
| Aminoalkylated sodium lignosulfonate | | |
| Dried - steam bath | −19 | 2.2 |
| Dried at 60° C at 20mm of Hg | −18 | 1.9 |
| Hydroxyphenylated lignosulfonate | −82 | — |
| Fermented calcium-base spent sulfite liquor | −66 | — |

The cationic character of the above aminoalkylated materials was further illustrated by the solubility characteristics of the products. The aminoalkylated hydroxyphenylated lignosulfonate had a limited solubility at a pH between about 3 to 10 but was soluble at a pH below 3 and above about pH 10. The aminoalkylated lignosulfonate which had not been hydroxyphenylated was soluble at a pH above 5 and insoluble below pH 5.

What is claimed is:

1. A process for the preparation of aminoalkylated hydroxyphenylated lignosulfonate which comprises reacting a lignosulfonate with a phenol until the phenolic hydroxyl content of the hydroxyphenylated lignosulfonate is at least 2½ weight percent, the reacting the hydroxyphenylated lignosulfonate with an aldehyde and a nitrogen compound selected from a group consisting essentially of ammonia, primary amines, secondary amines, and mixtures thereof, until the aminoalkylated hydroxyphenylated lignosulfonate contains at least 3 percent organic nitrogen, said aldehyde having no alpha hydrogen, and said amines having from 1 to 22 carbon atoms with substituents selected from the group consisting of alkyl, cycloalkyl, and substituted alkyl radicals of from 1 to 18 carbon atoms.

2. A process according to claim 1 wherein the lignosulfonate is reacted with phenol and the aldehyde is formaldehyde.

3. A process according to claim 2 wherein the nitrogen compound is a primary amine.

4. A process according to claim 2 wherein the nitrogen compound is a secondary amine.

5. A process according to claim 2 wherein the hydroxyphenylated lignosulfonate is reacted with the aldehyde and the nitrogen compound until the organic nitrogen content of the aminoalkylated hydroxyphenylated lignosulfonate is in the range of 5 to 9.

6. A process according to claim 5 wherein the nitrogen compound is a mixture of a secondary amine and ammonia.

7. A process according to claim 5 wherein the nitrogen compound is dimethylamine.

8. A process according to claim 5 wherein the nitrogen compound is a secondary alkanolamine.

9. A process for the preparation of an aminoalkylated hydroxyphenylated lignosulfonate which comprises intermixing phenol with lignosulfonate in an amount of from 20 to 100 weight percent based upon lignosulfonate solids, reacting the lignosulfonate with the phenol until at least 5 weight percent, based upon the lignosulfonate, of phenol has reacted with the lignosulfonate, and reacting the hydroxyphenylated lignosulfonate with a secondary amine and an aldehyde until the aminoalkylated hydroxyphenylated lignosulfonate contains at least 3% organic nitrogen, said aldehyde having no alpha hydrogens, and said secondary amine having from 2 to 22 carbon atoms with substituents selected from the group consisting of alkyl, cycloalkyl, and substituted alkyl radicals of from 1 to 18 carbon atoms.

10. A process according to claim 9 wherein the aldehyde is formaldehyde.

11. A process according to claim 10 wherein the amine is an alkylamine.

12. A process according to claim 11 wherein lignosulfonate as lignosulfonic acid is dissolved in the phenol and heated until from 20 to 35% phenol is reacted with the lignosulfonate.

13. A process according to claim 12 wherein the alkylamine is dimethylamine.

14. A process according to claim 12 wherein the amine is diethanolamine.

15. The composition prepared by the process of claim 1.

16. The composition prepared by the process of claim 2.

17. The composition prepared by the process of claim 3.

18. The composition prepared by the process of claim 5.

19. The composition prepared by the process of claim 10.

20. The composition prepared by the process of claim 11.

21. The composition prepared by the process of claim 13.

22. The composition prepared by the process of claim 14.

* * * * *

UNITED STATES PATENT OFFICE
CERTIFICATE OF CORRECTION

PATENT NO. : 4,017,475
DATED : April 12, 1977
INVENTOR(S) : Charles H. Ludwig

It is certified that error appears in the above-identified patent and that said Letters Patent are hereby corrected as shown below:

Column 1, line 7, change "as" to "and".

Column 10, line 8, before the word "reacting", change "the" to "and".

Signed and Sealed this twenty-third Day of August 1977

[SEAL]

Attest:

RUTH C. MASON
Attesting Officer

C. MARSHALL DANN
Commissioner of Patents and Trademarks